Nov. 28, 1944.  H. A. LAND ET AL  2,363,979

POWER TRANSMISSION MECHANISM

Original Filed Aug. 1, 1942   2 Sheets-Sheet 1

Inventors
H. A. Land
A. F. Bocksrucker
By:
Paul O. Pippel
Atty.

Nov. 28, 1944. H. A. LAND ET AL 2,363,979
POWER TRANSMISSION MECHANISM
Original Filed Aug. 1, 1942   2 Sheets-Sheet 2
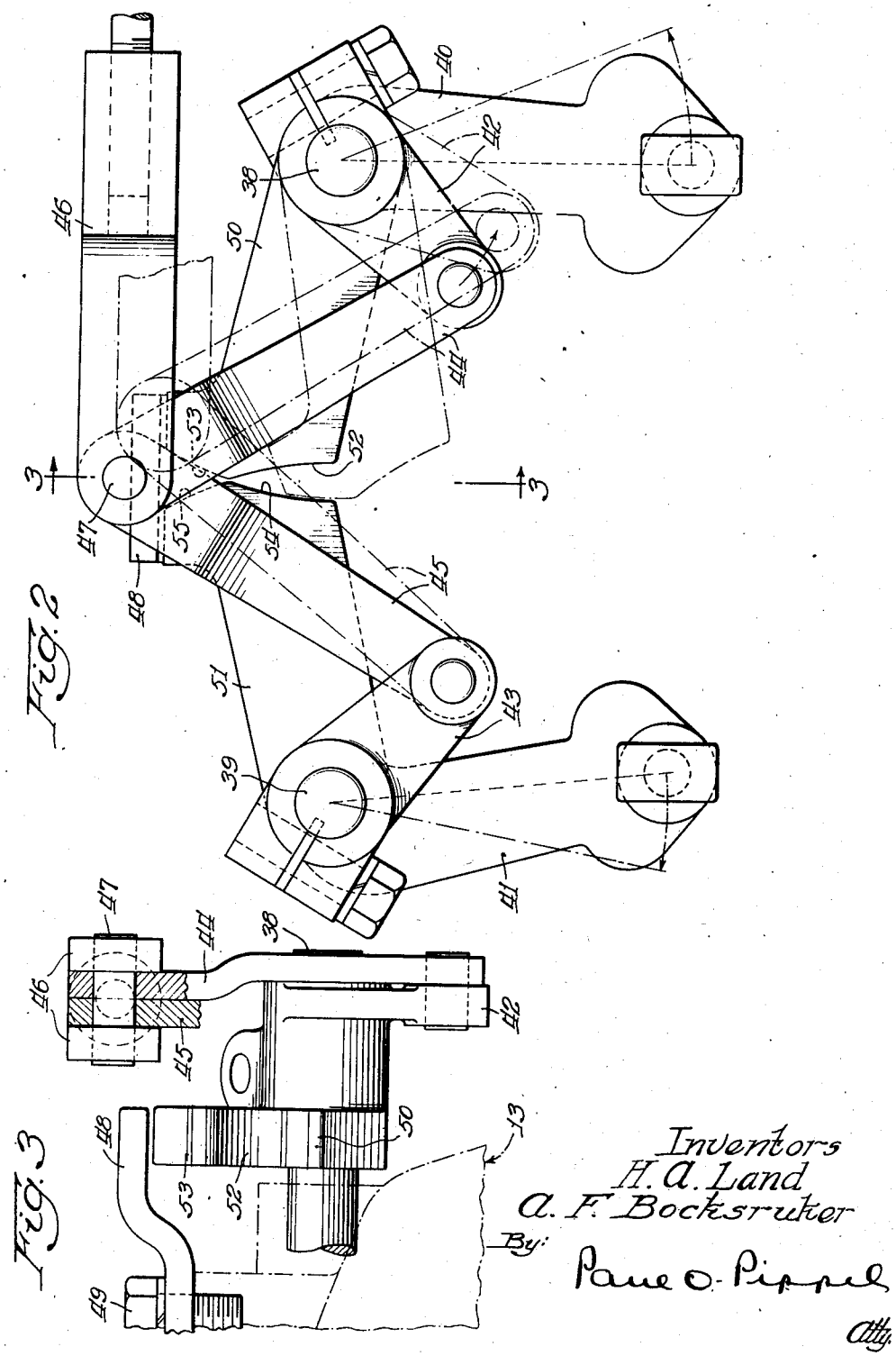
Inventors
H. A. Land
A. F. Bocksruker
By Paul O. Pippel
Atty.

Patented Nov. 28, 1944

2,363,979

UNITED STATES PATENT OFFICE 2,363,979

POWER TRANSMISSION MECHANISM

Harry A. Land, Chicago, and Alexander F. Bocksruker, Berwyn, Ill., assignors to International Harvester Company, a corporation of New Jersey Original application August 1, 1942, Serial No. 453,176. Divided and this application October 28, 1943, Serial No. 507,934

5 Claims. (Cl. 74—477)

This invention relates to a power transmission mechanism and more particularly to an improved shifting means for causing selected individual engagement of clutches in such mechanism. This application is a division of our copending application Serial No. 453,176, filed August 1, 1942, wherein there are claims directed to the transmission mechanism and to such mechanism in combination with the shifting means.

It is common in industrial and agricultural vehicles to provide power transmission means in the form of a power take-off shaft or the like for the driving of auxiliaries used with the vehicles. Such construction is particularly important in agricultural tractors. In the usual tractor there is provided a rear power take-off shaft, and in most cases there is also provided a separate shaft on which is mounted a belt pulley for use in the driving of equipment adapted to be belt driven. The power take-off shaft and belt pulley shaft are not connected in any manner and are usually operable separately. In certain types of tractors, however, no provision is made for a belt pulley, and if such power transmission means is desired, it is necessary to provide the same as an attachment to be driven by the standard power take-off shaft. Although such attachments serve the purpose for which they are intended, they have the disadvantage that the power take-off is no longer accessible for separate operation, since it must serve to operate the pulley attachment. In many cases it is desirable to use the tractor alternatively with equipment requiring either the power take-off shaft as such or the belt pulley, and in a few instances it is desirable to have both power sources available. It has, therefore, become quite a problem to provide a tractor with suitable power take-off means, inasmuch as the use of one take-off shaft deprives the operator of the simultaneous or easily attained use of a second shaft.

A general object of the present invention is to provide a simple form of control means for actuating clutches in a power take-off unit so that either of the power output shafts provided in the unit may be operated at the will of the vehicle operator.

Another object is to provide interlocking means in the control system so that both power output shafts cannot be operated concurrently, provision being made, however, for releasing the interlocking means so that both shafts can be operated concurrently, if desired.

These and other desirable objects of the invention will become apparent as the disclosure is more fully made in the following detailed description and accompanying sheets of drawings, in which:

Figure 2 is an enlarged elevational view of a preferred form of control system embodying the present invention for operating the clutches of the transmission mechanism; and Figure 3 is an end view, partly in section, of the structure shown in Figure 2.

Figure 1:
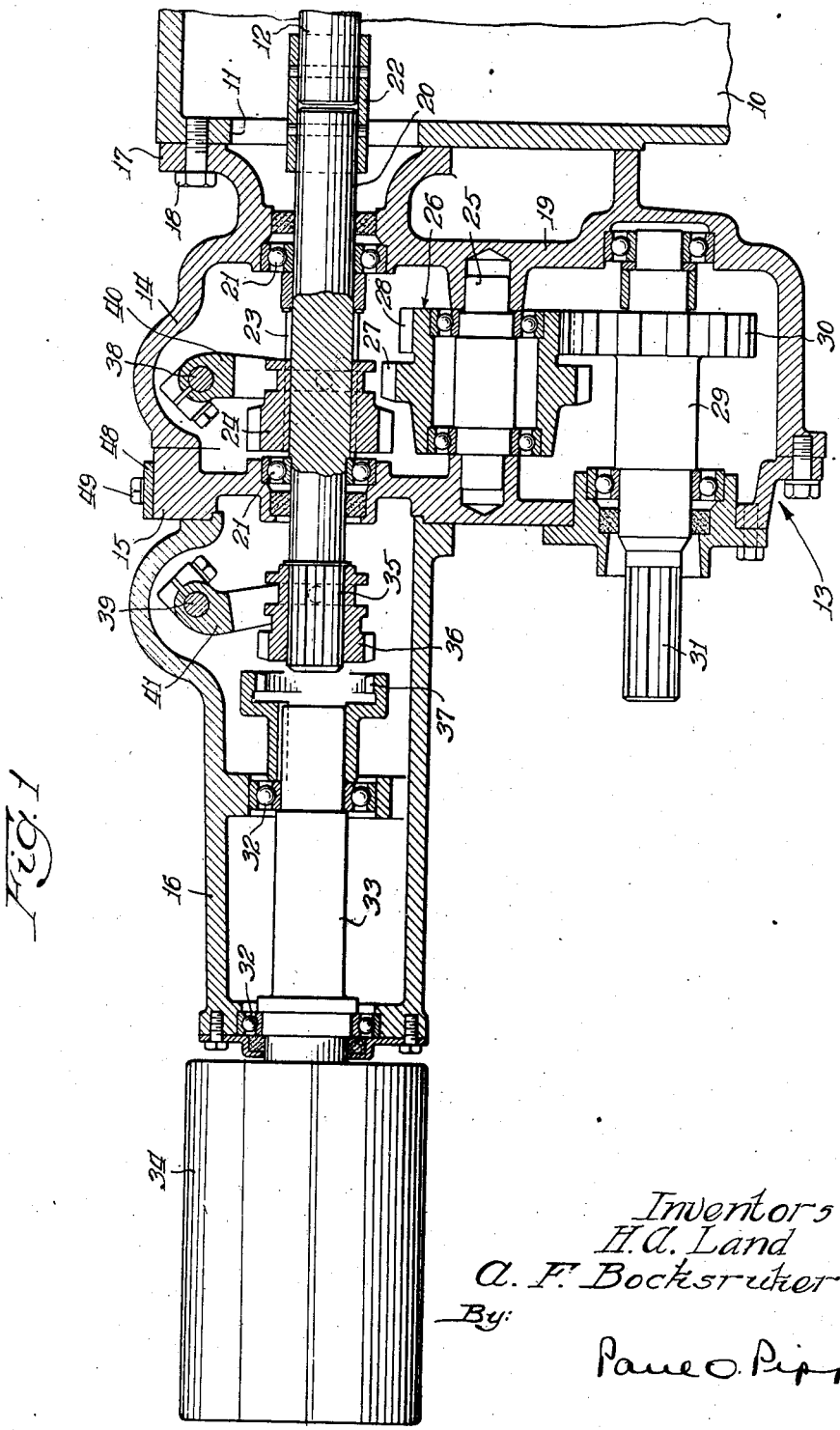
Figure 1 is a longitudinal sectional view of a power transmission attachment with which the invention is employable.

As shown in Figure 1, numeral 10 indicates the rear portion of a vehicle such as a tractor of conventional construction. The rear wall of this body portion of the vehicle is shown as being provided with an opening 11 through which access may be had to a power or driving shaft 12. This shaft may be driven in any suitable manner from the tractor transmission (not shown) and may in fact constitute the power take-off shaft provided on the tractor as original equipment.

The power take-off unit comprises a unitary housing structure, generally indicated at 13, preferably comprising a first housing 14 provided with a cover plate 15, and a second housing 16. The housing 14 is provided at one end with a transverse flange 17 which is adapted to be secured to the rear wall of the body portion 10 of the vehicle as by a plurality of cap screws 18, only one of which is shown. The housing 14 includes a transverse wall 19 generally paralleling the plate 15, and this wall and plate are apertured in longitudinal alinement with the driving shaft 12 of the tractor. A driving shaft 20 is journaled in antifriction bearings 21 in the walls 15 and 19 and is connected by a coupling 22 to the tractor power shaft 12. The portion of the shaft 20 between the bearings 21 is splined, as at 23, and carries for rotation therewith and shifting thereon a clutch element in the form of a gear 24.

The housing 14 carries an idler shaft 25 paralleling the shaft 20 and journaling a double idler gear 26 consisting of a gear 27 and a gear 28.

A third shaft 29, hereinafter referred to as a driven shaft, is journaled in the housing 14 and parallels the shafts 20 and 25. This shaft carries for rotation therewith a gear 30 in constant mesh with the gear 28 on the gear element 26. As will hereinafter appear, the shaft 29 is driven from the driving shaft 20 through the medium of gears 24, 27, 28, and 30, the clutch gear 24 being shiftable into engagement with the idler gear 27. The rearward end of the shaft 29 extends outside the cover plate or wall 15 and is splined as at 31 to provide a power take-off shaft adapted for connection to drive auxiliary implements or other equipment. The arrangement of the idler gear element 26 is such that the rotation of the shaft 29 is the same as that of the shaft 20.

The housing part 16 is rigidly but detachably secured to the cover plate or wall 15, and for all practical purposes the parts 14, 15, and 16 may be considered as forming part of a single unit, inasmuch as the entire attachment may be easily detached from the tractor body by the removal of the bolts or cap screws 18. The housing 16 is generally cylindrical in shape and is formed as a sleeve provided with a pair of longitudinally spaced antifriction bearings 32 which serve to journal a shaft 33. This shaft extends externally from the rear end of the housing 16 and has keyed or otherwise mounted thereon a pulley 34 adapted for use with a belt, in the usual manner. It will be understood, of course, that the pulley may be removed, and the end of the shaft used as an ordinary power take-off shaft. However, under many circumstances it is desired to have available the belt pulley 34 and the first power take-off shaft 31.

The rear end of the driving shaft 20, previously described, is splined as at 35 and serves to mount for axial shifting thereon a jaw clutch element 36. This element forms part of a disconnectable driving means cooperable with an internally toothed jaw clutch element 37 keyed to the proximate end of the shaft 33. As will hereinafter be described in greater detail, the element 36 is engageable with the element 37 so that the shafts 33 and 20 may be coupled together. Since these shafts are coaxial, their direction of rotation will be the same; and the rotation will be the same as that of the first power take-off shaft 31.

For the purpose of operating the shiftable elements of the pair of disconnectable driving means comprising the parts 24 and 27 and 36 and 37, there is provided a novel control means. As best shown in Figure 1, the housing structure 13 carries a pair of parallel rock-shafts 38 and 39 in proximity to the gear or clutch elements 24 and 36, respectively. The shaft 38 carries a shiftable yoke 40 engageable in the conventional manner with an annular groove in the gear element 24. The rock-shaft 39 carries a yoke 41 similarly associated with the gear element 36.

Experience has shown that it is desirable to operate the power take-off shafts, here the shafts 31 and 33, independently of each other; that is, it is not very often that simultaneous use of the shafts is required. It is therefore desirable that the control means for the disconnectable driving means between the shafts 20 and 29 and 33 be cooperable for selective operation. According to the present invention, such control system is provided.

As best shown in Figures 2 and 3, the rock-shaft 38 extends outside the housing structure 13 carries rigidly thereon an operating arm 42. The rock-shaft 39 is similarly provided with an arm 43. These arms are connected by two links 44 and 45, each of which is pivoted at one end to one of the arms. The links converge upwardly and their free ends are pivoted together and to an operating member 46 by means of a pin 47. The operating member 46 may be suitably connected to any type of control lever, not shown.

The housing structure 13 carries at an intermediate upper portion thereof, in the vicinity of the connection between the links 44 and 45, means in the form of a stop member 48. This member is secured by a bolt 49 to an upper portion of the intermediate plate or wall 15 of the housing structure and extends outwardly therefrom generally paralleling the rock-shafts 38 and 39. The rock-shaft 38 carries rigidly thereon a locking member 50. As best shown in Figure 3, this member may be an integral part of the element forming the arm 42. The rock-shaft 39 is provided with a locking member 51 similarly associated with the arm 43. Thus far it will be seen that rocking of the shafts 38 and 39 is effected through operation of the control member 46, links 44 and 45, and arms 42 and 43. As previously stated, however, it is desirable that simultaneous rocking of the rock-shafts be prevented. To that end the members 50 and 51 are provided with locking portions, to be presently described.

As best shown in Figure 2, the locking members 50 and 51 extend toward each other and have their proximate ends closely adjacent each other and disposed below the outwardly projecting portion of the stop member 48. The locking member 50 is provided with a pair of curved surfaces 52 and 53, and the member 51 is provided with a pair of similar surfaces 54 and 55. The surface 53 on the member 50 is arcuate and is formed about a radius having the axis of the rock-shaft 38 as its center. The surface 54 on the member 51 is arcuate and is formed on the same radius. A similar relationship exists between the surfaces 52 and 55 of the members 50 and 51, respectively; that is, these surfaces are both arcuate and are both formed about the axis of the rock-shaft 39 as a center.

The operation of the control means is as follows: As indicated in broken lines in Figure 2, the rock-shaft 38 has been rocked in a counterclockwise direction, thus effecting an engagement between the gear or clutch elements 24 and 27. Accordingly, the power take-off shaft 31 will be driven. The rock-shaft 39 remains in a neutral position, with the gear elements 36 and 37 disengaged. Hence, the shaft 33 will not be rotated. When the rock-shaft 38 is rotated, as just indicated, the member 50 swings downwardly, and the arcuate surface 53 thereon becomes disposed below the intersection between the surfaces 54 and 55 on the member 51. It will thus be seen that it is now impossible for the member 51 to move downwardly, since the surface 53 on the member 50 serves as a stop or an abutment in its contemplated path of movement. The member 51 is prevented from moving in a counterclockwise direction by the stop member 48. Accordingly, the rock-shaft 39 cannot be rocked while the rock-shaft 38 is disposed in a position in which the gear or clutch parts 24 and 27 are engaged. The rock-shaft 38, after being restored to neutral position, may be similarly locked against movement by rocking of the rock-shaft 39 in a clockwise direction, with the resultant disposition of the member 51 as a locking member in the possible path of movement of the member 50. It will be noted that the stop member 48 serves the double function of locking both members 50 and 51 against movement upwardly. This provision is important from the standpoint of operation of the control means, as will presently appear.

The functioning of the control system is made possible by the provision of the stop member 48 and the interconnecting of the arms 42 and 43 by the links 44 and 45. For example, the control member 46, when moved to the right as viewed in Figure 2, exerts an upward force on the link 45. However, the stop 48 limits further upward movement of the member 51 with the result that continued movement of the member 46 to the right transfers its force downwardly through the link 44 to the arm 42 on the rock-shaft 38. This result is indicated by the broken lines in Figure 2. Similarly, if it is desired to rock the rock-shaft 39, the control member 46 is moved to the left. The upward force exerted on the link 44 is transferred to a downward force on the link 45, with the result that the rock-shaft 39 is rotated in a clockwise direction. It will be understood, of course, that when either of the rock-shafts 38 and 39 is in such a position that its corresponding clutch or gear means is engaged, return of the control toward its central position restores the engaged driving means to neutral or disengaged position so that the parts assume the positions illustrated in full lines in Figure 2.

From the foregoing description, it will be seen that there has been provided a unitary power transmission attachment characterized by a pair of power output or power take-off shafts, and that this attachment may be readily mounted on and used with a conventional type of vehicle, for the purpose of providing a pair of selectively usable power take-off shafts. This arrangement eliminates the prior disadvantage of providing a special attachment for connection to the regular power take-off shaft of the tractor, which prior construction, as previously stated, resulted in the elimination of the power take-off shaft through the use of the belt pulley. According to the present construction, both types of power shafts are immediately available. Other features and advantages of the invention will suggest themselves to those skilled in the art.

It will be understood, of course, that the foregoing description and accompanying drawings relate to only a preferred embodiment of the invention, and that numerous modifications and alterations may be made therein without departing from the spirit and scope of the invention as defined in the appended claims.

What is claimed is:

1. Control mechanism comprising a support including a pair of parallel pivot axes, a pair of arms rockable respectively on the pivot axes, a pair of links pivotally interconnected and pivotally connected respectively to the arms, stop means for limiting rocking of one arm in one direction, stop means for limiting rocking movement of the other arm in one direction, and control means including a member pivotally connected to the interconnected ends of the links and having movement in a plane transverse of the pivot axes of said rock arms for rocking one arm against its stop means and the other arm away from its stop means.

2. Control mechanism comprising a support including a pair of pivot axes, a pair of arms rockable respectively on the pivot axes, means interconnecting the arms, stop means for limiting rocking of one arm in one direction, stop means for limiting rocking movement of the other arm in one direction, and control means connected to the interconnecting means for rocking one arm against its stop means and the other arm away from its stop means.

3. In combination, a support; a pair of parallel rock-shafts carried by the support; a pair of arms secured respectively to the rock-shafts and extending toward each other with their adjacent ends in close proximity; a stop member carried by the support and disposed to limit rocking of each arm in one direction; means for rocking either arm selectively; and a pair of means respectively on the arms adapted, upon rocking of one arm away from the stop member to lock the other arm against rocking away from the stop member.

4. In combination, a support including a pair of parallel pivot axes; a pair of arms respectively rockable about said axes and extending toward each other with their adjacent ends in close proximity; a stop means disposed to limit rocking of one arm in one direction; stop means for limiting rocking of the other arm in one direction; means for rocking either arm selectively; and means associated with the arms and adapted, upon rocking of one arm away from its stop means, to lock the other arm against rocking away from its stop means.

5. In a change-speed transmission control employing a pair of parallel laterally spaced rock-shafts respectively connected with shiftable power train connecting elements and rockable in opposite directions to respectively shift said elements to and from power train connecting positions, an operating structure movable oppositely transversely of said rock-shafts, arms respectively constrained for rocking with said rock-shafts and projecting radially therefrom, links pivotally connected with said arms and extending angularly therefrom into pivotal connection with said operating structure, said links being operable to transmit force from the operating structure to said arms for urging the rock-shafts to rock in respective first directions pursuant to movement of the operating structure in one direction, stop means limiting such first direction movement of one of the rock-shafts during such movement of the operating structure in its one direction and attendant to relative pivoting of the link and arm associated with the one rock-shaft to facilitate said one direction movement of the operating structure, said links also being operable to transmit force from the operating structure to said arms for urging the rock-shafts to rock in respective second directions pursuant to movement of the operating structure in the opposite direction, and stop means limiting such second direction movement of the other rock-shaft during such opposite direction movement of the operating structure and attendant to relative pivoting of the link and arm associated with such other rock-shaft to facilitate said opposite direction movement of the operating structure.

HARRY A. LAND.
ALEXANDER F. BOCKSRUKER.